No. 777,873. PATENTED DEC. 20, 1904.
A. A. WEEKS.
COLLAPSIBLE BARREL.
APPLICATION FILED APR. 16, 1904.
NO MODEL.
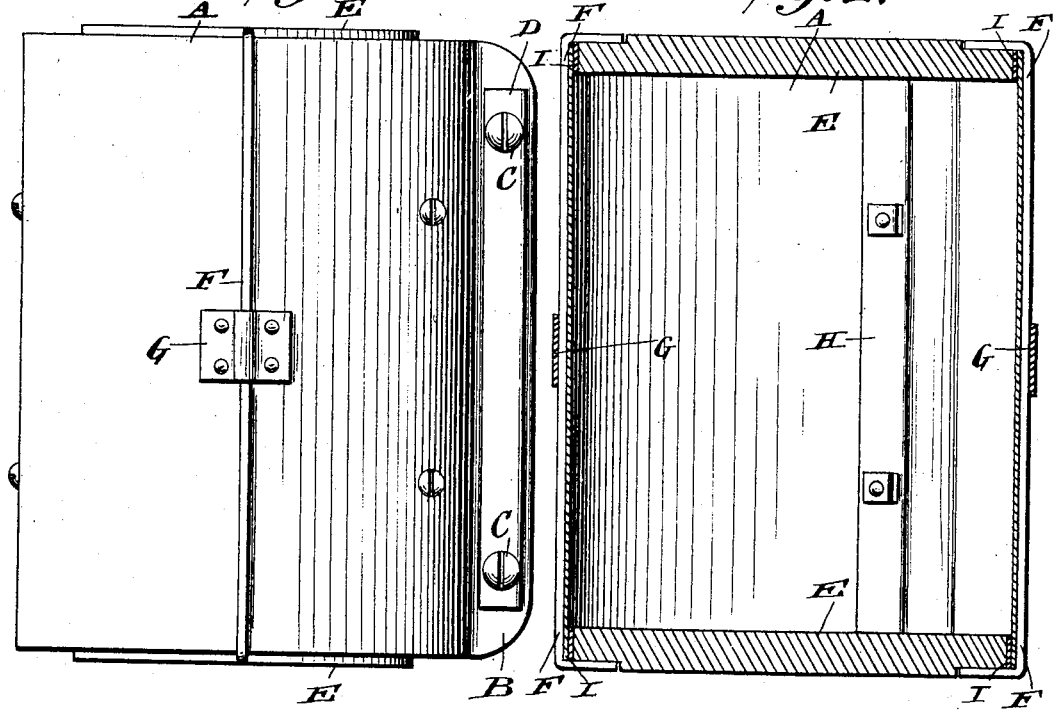
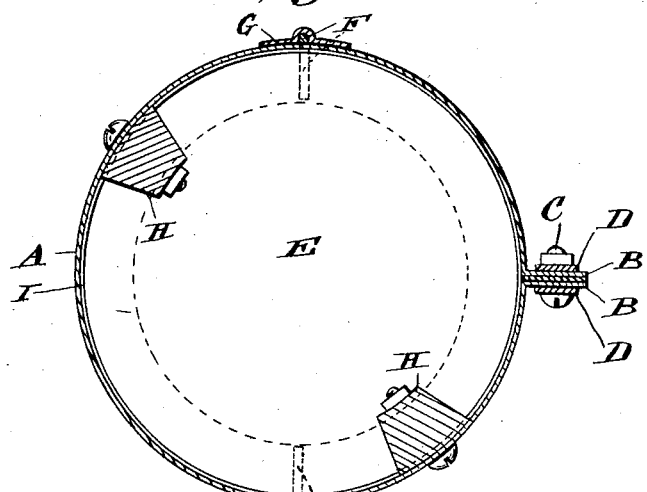
Inventor
Albert A. Weeks
Witnesses No. 777,873. Patented December 20, 1904.

UNITED STATES PATENT OFFICE.

ALBERT A. WEEKS, OF PRATT, KANSAS.

COLLAPSIBLE BARREL.

SPECIFICATION forming part of Letters Patent No. 777,873, dated December 20, 1904.

Application filed April 16, 1904. Serial No. 203,474.

*To all whom it may concern:*

Be it known that I, ALBERT A. WEEKS, a citizen of the United States, residing at Pratt, in the county of Pratt and State of Kansas, have invented certain new and useful Improvements in Collapsible Barrels, of which the following is a specification.

My invention relates to barrels of a collapsible nature, and has for its object the production of a barrel that is simple in construction and operation and reasonable in cost of manufacture.

The construction and advantages of my invention will fully appear hereinafter, and by reference to the accompanying drawings, in which—

Figure 1 is a view in elevation of my invention; Fig. 2, a view in longitudinal section; and Fig. 3, a view in cross-section.

Referring to the drawings, in which similar reference characters indicate corresponding parts throughout the several views, A represents the casing of my barrel made of sheet metal and having its meeting edges turned outwardly to form flanges B. The casing is secured in a cylindrical form by means of bolts C, passed through holes in said flanges B, D being bars of metal placed one on each side of flanges B to add rigidity to the joint made by said flanges.

E represents the heads of the barrel that are held in place by two or more double hook-ended rods F, revolubly secured to casing A by means of straps G.

H represents longitudinal ribs secured to the inner side of casing A and serve not only to add rigidity thereto, but also to form rests for the heads E.

The form of barrel above described may be used for fruits, vegetables, &c.; but when it is desired to use the barrel for liquids, flour, or other like commodity it will be necessary to provide packing I between the heads and casing and between the flanges B to insure fluid-tight joints.

It will be readily understood from the above description and an inspection of the drawings that after the barrel has been emptied of its contents it may be collapsed for return shipment by removing the bolts C and flattening the casing A. The contents of the barrel may be removed by removing one of the heads E, or, if containing a liquid, by inserting a faucet in one of the heads. It will also be apparent that instead of the hooked rods F for securing the heads E in position the heads may be secured by means of nails driven through the casing and into the edge of the heads.

Having thus described my invention, what I claim is—

A collapsible barrel comprising a casing consisting of a single sheet of metal having its meeting edges bent outwardly to form flanges, a strip of packing interposed between said flanges, metal bars seated on the outside of said flanges, said bars, flanges and packing being perforated in alinement, bolts secured through said perforations, ribs secured on the inside of the casing, heads adapted to seat in the ends of the casing and rest against the ends of said ribs, and rods revolubly mounted on said casing and having their ends bent to form hooks to hold said heads in position, substantially as shown and described.

In testimony whereof I hereto affix my signature in the presence of two witnesses.

ALBERT A. WEEKS.

Witnesses:
S. P. GEBHART,
CHAS. R. MAWDSLEY.